(12) United States Patent
Shiraki et al.

(10) Patent No.: US 9,880,274 B2
(45) Date of Patent: Jan. 30, 2018

(54) UNDERWATER DETECTION APPARATUS

(71) Applicant: FURUNO ELECTRIC CO., LTD., Nishinomiya (JP)

(72) Inventors: Rika Shiraki, Amagasaki (JP); Norio Matsuhiro, Sakai (JP); Minoru Handa, Ikoma (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 5 days.

(21) Appl. No.: 15/092,307

(22) Filed: Apr. 6, 2016

(65) Prior Publication Data
US 2016/0306033 A1 Oct. 20, 2016

(30) Foreign Application Priority Data

Apr. 20, 2015 (JP) .................................. 2015-086087

(51) Int. Cl.
| | | |
|---|---|---|
| G08B 23/00 | (2006.01) | |
| G01S 15/00 | (2006.01) | |
| G10K 11/00 | (2006.01) | |
| G01S 7/539 | (2006.01) | |
| G01S 15/96 | (2006.01) | |

(52) U.S. Cl.
CPC .............. *G01S 7/539* (2013.01); *G01S 15/96* (2013.01)

(58) Field of Classification Search
CPC ...... G01S 15/96; G01S 7/52004; G01S 15/02; G01S 15/89; G01S 1/72; G01S 7/034; G01S 7/282; G01S 7/529; G01S 7/6263; G01S 7/64

USPC ............................ 367/93, 99, 141; 340/984
See application file for complete search history.

(56) References Cited

U.S. PATENT DOCUMENTS

| | | | | |
|---|---|---|---|---|
| 4,081,783 A * | 3/1978 | Honda | ..................... | G01S 15/96 367/101 |
| 4,597,069 A * | 6/1986 | Milano | ..................... | G01S 15/96 367/108 |
| 6,198,692 B1 * | 3/2001 | Sekine | ..................... | G01S 7/62 367/11 |

(Continued)

OTHER PUBLICATIONS

Barange, M., et al, "Empirical Determination of In Situ Target Strengths of Three Loosely Aggregated Pelagic Fish Species", Section III, Fish and Plankton Target Strength, ICES Journal of Marine Science, 53: 225-232, 1996, 8 pgs.

(Continued)

*Primary Examiner* — Emily C Terrell
(74) *Attorney, Agent, or Firm* — Knobbe, Martens, Olson & Bear, LLP

(57) ABSTRACT

An underwater detection apparatus is provided. The underwater detection apparatus includes a transmitter, a receiver, and a hardware processor. The transmitter transmits a transmission wave. The receiver obtains a receive signal based on a reflection of the transmission wave. The hardware processor is programmed to at least detect an underwater target object based at least in part on the receive signal, estimate a density index value of objects within a given area in a vicinity of the underwater target object, and calculate a size index value of the underwater target object based at least in part on the density index value and a target object signal intensity representing a maximum intensity of the receive signal corresponding to the underwater target object.

11 Claims, 13 Drawing Sheets

(56) References Cited

U.S. PATENT DOCUMENTS

| | | | | |
|---|---|---|---|---|
| 2005/0169106 A1* | 8/2005 | Chen | ................... | G01S 15/96 367/118 |
| 2008/0080317 A1* | 4/2008 | Inouchi | ................ | G01S 7/539 367/112 |
| 2010/0284248 A1* | 11/2010 | Wang | ................ | G01S 7/6227 367/88 |
| 2015/0085614 A1* | 3/2015 | Lebedev | ............. | G01S 15/96 367/99 |
| 2016/0146936 A1* | 5/2016 | Konig | ................. | G01S 15/96 367/99 |

OTHER PUBLICATIONS

Gauthier, S. and Rose, G. A., "Diagnostic Tools for Unbiased in Situ Target Strength Estimation", Can. J. Fish. Aquat. Sci. vol. 58: 2149-2155 (2001), 7 pgs.

Sawada, K., et al., "Conditions for the Precise Measurement of Fish Target Strength in Situ", National Research Institute of Fisheries Engineering, Alaska Fisheries Science Center, National Marine Fisheries Service, National Oceanic and Atmospheric Administration, U.S.A, Oct. 7, 1992, 7 pgs.

Extended European Search Report dated Sep. 7, 2016 in corresponding European application No. 16160723.9, 8pgs.

Godlewska, M., et al., "Hydroacoustic Measurements at Two Frequencies: 70 and 120 kHz—Consequences for Fish Stock Estimation", Fisheries Research, vol. 96, No. 1, Journal Homepage: www.elsevier.com/locate/fisheries, 2009, 6 pgs.

* cited by examiner

UNDERWATER DETECTION APPARATUS

CROSS-REFERENCE TO RELATED APPLICATION(S)

This application claims priority under 35 U.S.C. § 119 to Japanese Patent Application No. 2015-086087, which was filed on Apr. 20, 2015, the entire disclosure of which is hereby incorporated by reference.

TECHNICAL FIELD

This disclosure generally relates to an underwater detection apparatus that detects an underwater target object, and especially an underwater detection apparatus that can estimate a size of the detected target object.

BACKGROUND

As a conventional fish finder (underwater detection apparatus), an apparatus having a function to estimate a length (size) of a fish (target) is known (see for example "Barange, M., Hampton, I., and Soule, M. 1996. Empirical determination of in situ target strengths of three loosely aggregated pelagic fish species.—ICES Journal of Marine Science, 53: 225-232", "Sawada, K., Furusawa, M., Williamson, N. 1993. Conditions for the precise measurement of fish target strength in situ.—Ocean Acoustic Journal, 1993, Volume 20, No. 2, p 73-79", "Gauthier, S., Rose, G. 2001. Diagnostic tools for unbiased in situ target strength estimation.—Canadian Journal of Fisheries and Aquatic Sciences, 2001, 58, p 2149-2155"). Typically, with a fish finder, when a peak waveform (which may also be referred to as a peak) of a receive signal obtained from a reflection wave reflected on a fish satisfies given conditions, the peak waveform is considered as being caused by a single fish and a single fish is detected. Specifically, with a fish finder, a single fish is detected based on various information obtained from a peak waveform such as peak intensity of the peak waveform, shape of the peak waveform, phase stability information etc. Then, with a fish finder, the peak intensity of the peak waveform of the detected single fish is transformed into a TS (Target Strength) value and a fish length is estimated based on said TS value.

SUMMARY (1) In one aspect of the present disclosure, an underwater detection apparatus is provided. The underwater detection apparatus includes a transmitter, a receiver, and a hardware processor. The transmitter transmits a transmission wave. The receiver obtains a receive signal based on a reflection of the transmission wave. The hardware processor is programmed to at least detect an underwater target object based at least in part on the receive signal, estimate a density index value of objects within a given area in a vicinity of the underwater target object, and calculate a size index value of the underwater target object based at least in part on the density index value and a target object signal intensity representing a maximum intensity of the receive signal corresponding to the underwater target object.

(2) The hardware processor may be further programmed to at least categorize the density index value into a category of a plurality of categories, and calculate the size index value based on the target object signal intensity and the category.

(3) When the category that represents a range of density index values is above a given value, the hardware processor may be further programmed to at least adjust the size index value of the underwater target object.

(4) When the category that represents a range of density index values is above a given value, the hardware processor may be further programmed to at least reduce the size index value of the underwater target object.

(5) The given area may represent an area that includes the detected underwater target object.

(6) The given area may represent a time period that lasts for up to about 50 times a duration of the transmission wave.

(7) The hardware processor may be further programmed to at least estimate the density index value based at least in part on a number of peaks included in the receive signal within the given area.

(8) The hardware processor may be further programmed to at least estimate the density index value based at least in part on an average intensity value of the receive signal within the given area.

(9) The hardware processor may be further programmed to at least estimate for each detected underwater target object the density index value of the objects in the vicinity of each detected underwater target object, and calculate the size index value of each said underwater target object based on the target object signal intensity corresponding to each said underwater target object and the density index value estimated at each said underwater target object.

(10) The hardware processor may be further programmed to at least calculate a size frequency distribution of at least two underwater target objects from a plurality of underwater target objects based on the size index value of the at least two underwater target objects.

(11) The hardware processor may be further programmed to at least calculate the size frequency distribution based on the size index value of the underwater target objects whose density index value is below a given value.

(12) The underwater detection apparatus may be a fish finder and the underwater target object may be a fish.

According to this disclosure, size of target objects can be more accurately estimated.

BRIEF DESCRIPTION OF THE DRAWINGS

The present disclosure is illustrated by way of example and not by way of limitation in, the figures of the accompanying drawings, in which the like reference numerals indicate like elements and in which.

DETAILED DESCRIPTION

With a school of fish, when the fish density gets high or when fish depth gets deep, peak waveforms of the receive signals interfere with each other and TS values of peak waveforms determined as being caused by single fish tend to be high, which gives a fish length estimation longer than it actually is. However, none of the publications cited above solve this problem.

Certain embodiments of this disclosure relates to more accurately estimating size of target objects.

Figure 1:
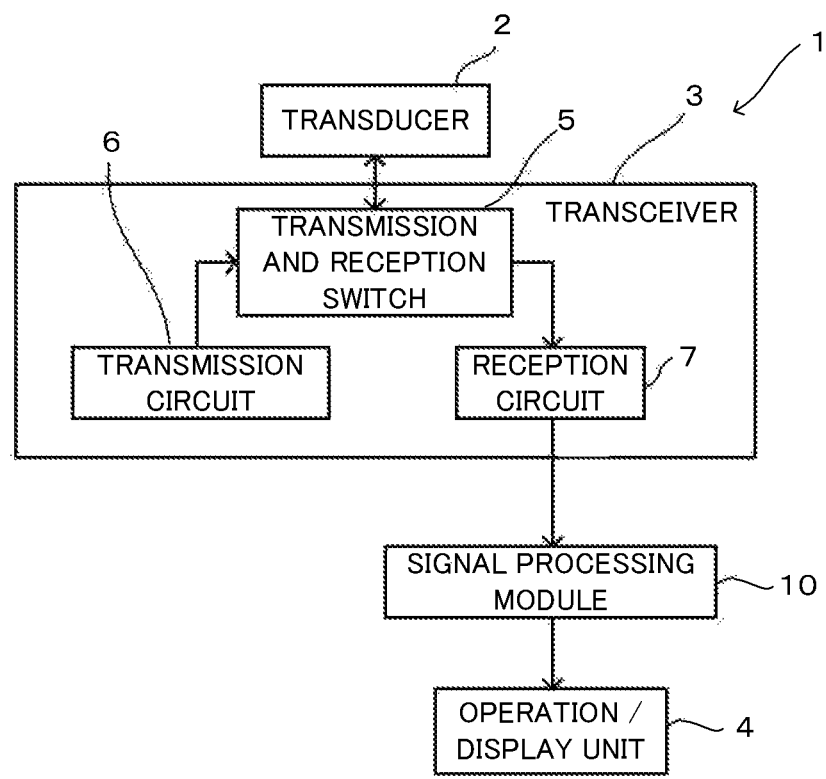
FIG. 1 shows a block diagram of an arrangement of a fish finder according to an embodiment of the present disclosure.

FIG. 1 shows a block diagram of an arrangement of a fish finder 1 as an underwater detection apparatus according to an embodiment of the present disclosure. Hereinafter, fish finder 1 according to the embodiment of the present disclosure is described with reference to the drawings. Fish finder 1 shown in FIG. 1 is arranged to estimate fish length (size) and number of fish within a detection range in water. Fish finder 1 is for example installed on a ship such as a fishing vessel. Note that, hereinafter, fish finder 1 uses fish as an example of a target of interest but any underwater object or body including other aquatic species may also be used as a target of interest.

Example Overall Configuration

As shown in FIG. 1, fish finder 1 comprises a transducer 2, a transceiver 3, a signal processing module 10, and an operation/display unit 4.

As a transmitter, the transducer 2 can transform electrical signal into an ultrasonic wave (which may also be referred to as a transmission wave) and can transmit the ultrasonic wave into the water. In some cases, the transducer 2 may operate repeatedly or intermittently at given timings (for example, at a given cycle). As a receiver, transducer 2 may also transform received ultrasonic wave into an electrical signal (which may also be referred to as a receive signal). An ultrasonic wave of a given frequency is repeatedly transmitted at given timings and for a given duration from transducer 2 of the present embodiment.

Figure 2:
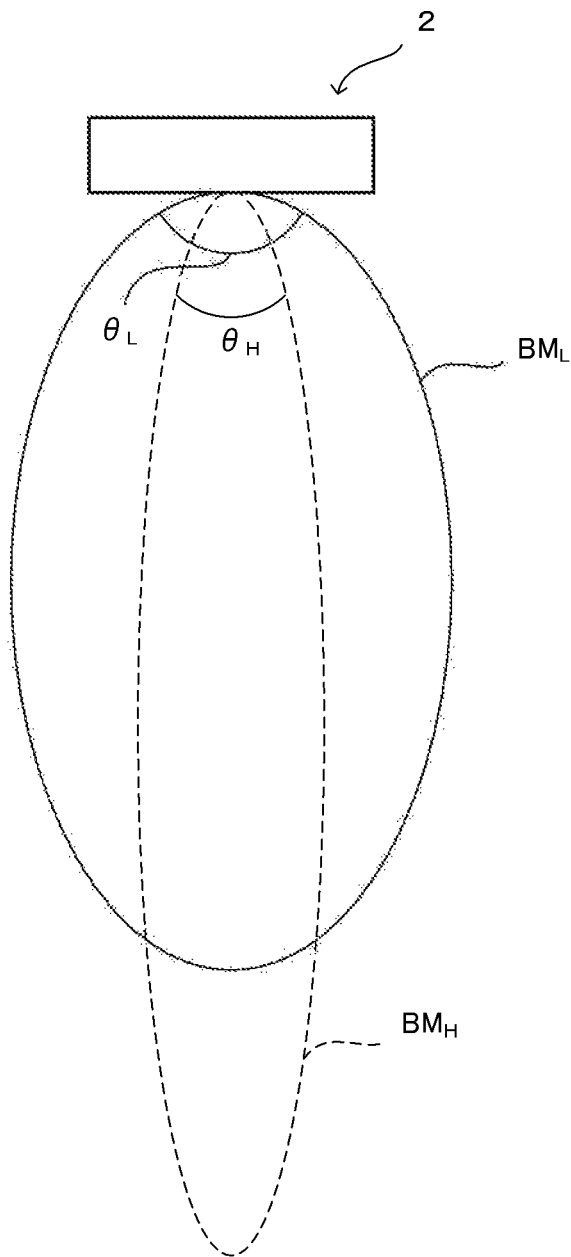
FIG. 2 shows schematically a wide beam and a narrow beam formed by the transducer shown in FIG. 1.

FIG. 2 shows schematically a wide beam $BM_L$ and a narrow beam $BM_H$ formed by the transducer 2. The beam width of the wide beam $BM_L$ is typically wider than that of the narrow beam $BM_H$. Note that, the beam width corresponds to an angle between positions with an intensity that is 3 dB lower relative to the direction of maximum intensity of an ultrasonic wave. With reference to FIG. 2, the beam width of wide beam $BM_L$ is represented as $\theta_L$ and the beam width of narrow beam $BM_H$ is represented as $\theta_H$.

In some instances, the transducer 2 can form two beams with each of the beams having different frequencies (e.g., low frequency and high frequency). Namely, transducer 2 forms in alternation the wide beam $BM_L$ when low frequency ultrasonic wave is transmitted (or received) and the narrow beam $BM_H$ when high frequency ultrasonic wave is transmitted (or received).

The transceiver 3 is comprised of a transmission and reception switch 5, a transmission circuit 6, and a reception circuit 7. During transmission, the transmission and reception switch 5 can connect the transmission circuit 6 and transducer 2 to supply a transmission signal from the transmission circuit 6 to transducer 2. During reception, the transmission and reception switch 5 can connect transducer 2 and reception circuit 7 so that reception wave transformed into electrical signal by transducer 2 is supplied to the reception circuit 7.

The transmission circuit 6 can generate a transmission signal based on the conditions set via the operation/display unit 4 and can supply the transmission signal to transducer 2 via the transmission and reception switch 5. In order to have an ultrasonic wave of a given frequency transmitted from transducer 2 as explained above, the transmission circuit 6 of the present embodiment supplies a signal to transducer 2 as the source of said ultrasonic wave.

The reception circuit 7 can amplify the electrical signal supplied from transducer 2 and perform an analog to digital conversion of the amplified receive signal. The reception circuit 7 then supplies the converted digital receive signal to the signal processing module 10.

The signal processing module 10 can process the receive signal outputted by the reception circuit 7 and generate a video signal of the target. The signal processing module 10 can also generate a histogram that shows a number of fish of a given fish length in a given range of water with reference to own ship on which fish finder 1 is installed. Without any limitation to a histogram, the signal processing module 10 can also more generally generate a frequency distribution of fish size. The arrangement of the signal processing module 10 will be explained in detail later.

Figure 3:
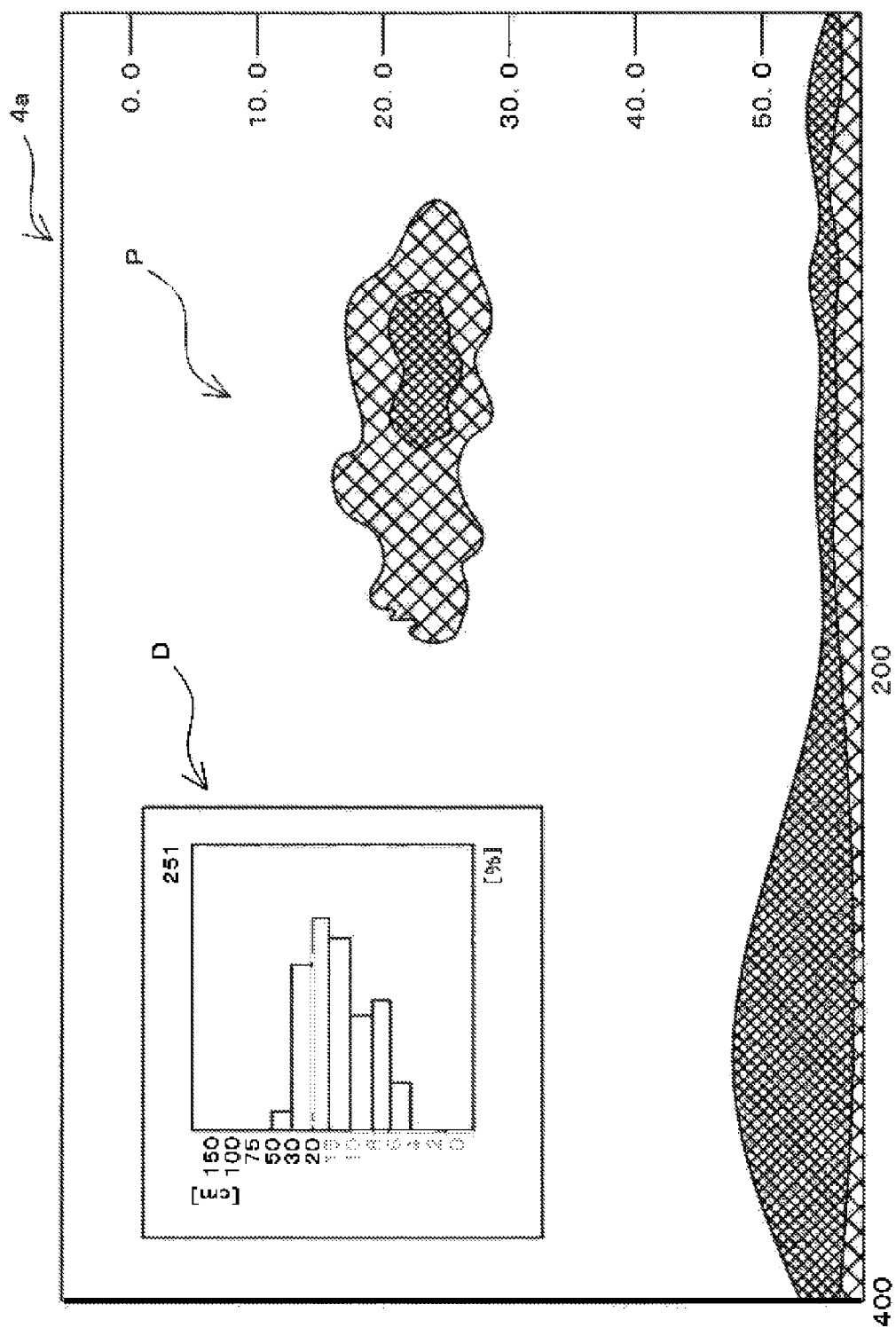
FIG. 3 shows schematically an example of a display screen of an operation/display unit of the fish finder shown in FIG. 1.

FIG. 3 shows schematically an example of a display screen 4a of the operation/display unit 4 of the fish finder 1 shown in FIG. 1. As shown in FIG. 3, the operation/display unit 4 can display on the display screen 4a an image P that corresponds to the video signal outputted by the signal processing module 10. By looking at image P on display screen 4a, a user can estimate a situation of the sea below the ship (e.g., presence or absence of fish, position of fish relative to own ship etc.). The operation/display unit 4 may also comprise a variety of input means such as input buttons so that various settings or parameters related to transmission and reception of ultrasonic wave, signal processing or image display can be inputted. Note that the vertical axis of the display screen 4a shown in FIG. 3 corresponds to depth. Moreover, numerical values on the horizontal axis of display screen 4a shown in FIG. 3 represent ping numbers, one ping corresponding to one ultrasonic wave transmission.

As shown in FIG. 3, histogram D generated by the signal processing module 10 is also displayed on the display screen 4a of the operation/display unit 4. The number of fish detected as single fish is represented in percentage for every fish length on histogram D. Moreover, on the example shown in FIG. 3, the total number of fish detected is also displayed on the right-upper part of histogram D. Note that, in the explanation above, the number of fish detected as single fish is represented in percentage for every fish length but this should not be a limitation, the number of fish detected as single fish can be represented in number of occurrences for every fish length.

Example Configuration of Signal Processor

Figure 4:
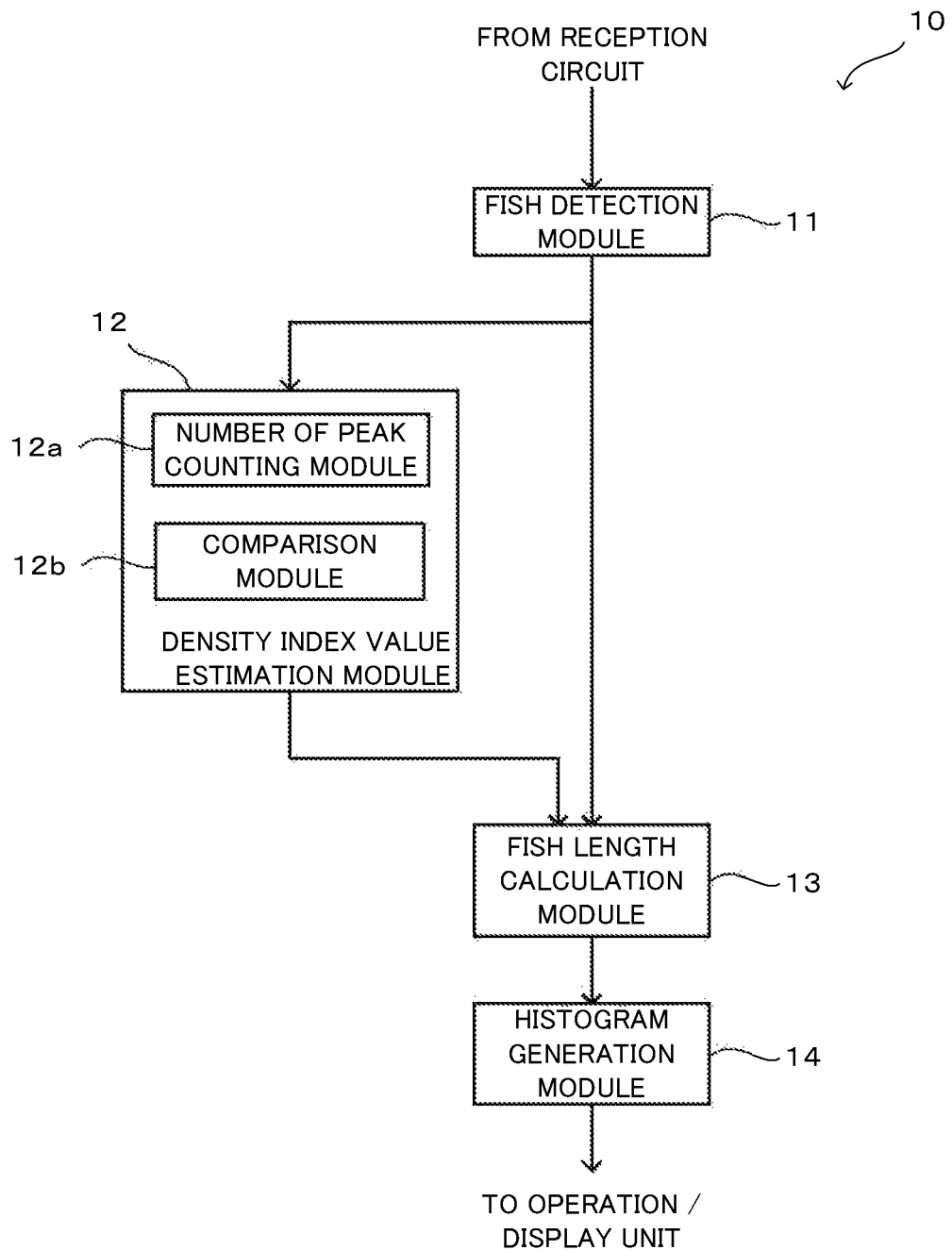
FIG. 4 shows a block diagram of an arrangement of a signal processing module of the fish finder shown in FIG. 1.

FIG. 4 shows a block diagram of an arrangement of one example of the signal processing module 10 of fish finder 1 shown in FIG. 1. As shown in FIG. 4, the signal processing module 10 may comprise a fish detection module 11, a density index value estimation module 12, a fish length calculation module 13, and a histogram generation module 14. The signal processing module 10 is, for example, implemented on a hardware processor (e.g., CPU, FPGA) and a non-volatile memory (not shown in the figures). For example, by having the hardware processor read a program from the non-volatile memory and execute the program, it is possible to implement the functions of the fish detection module 11, the density index value estimation module 12, the fish length calculation module 13, and the histogram generation module 14.

The fish detection module 11 may be arranged to detect, as a target object, fish based on the receive signal outputted by reception circuit 7. In more detail, the fish detection module 11 may detect fish by determining based at least in part on a receive signal when plotted in a coordinate system, in which a horizontal axis is time and a vertical axis is amplitude, whether a peak waveform (which may also be referred to as a peak) within the receive signal is caused by a fish or not, and may set the peak value (which may also be referred to as the target object signal intensity) of the peak waveform as the target strength value (TS value) of the fish. Note that the intensity of a signal can be defined for example as the amplitude or the square of the amplitude of the signal. As an example, as disclosed in US2008/0080317A1, the fish detection module 11 may comprehensively evaluate for example a peak value of the peak waveform, a gradient of the rising edge of the peak waveform, a gradient of the falling edge of the peak waveform in order to determine whether the peak waveform is caused by a fish or not. In this way, by comprehensively evaluating a plurality of parameters, false detection of fish can be avoided. Note that the operation of the fish detection module 11 explained above is merely an example and other method can be used to detect fish.

From the fish detected by the fish detection module 11, the density index value estimation module 12 may calculate a density index value (namely, a value indicative of density) of fish in a given area (which may also be referred to as a gate range or a time period) as a number of peaks thought to be caused by fish, and may categorize fish density into a plurality of categories depending on the count number. The density index value estimation module 12 may include a number of peak counting module 12a and a comparison module 12b.

Figure 5:
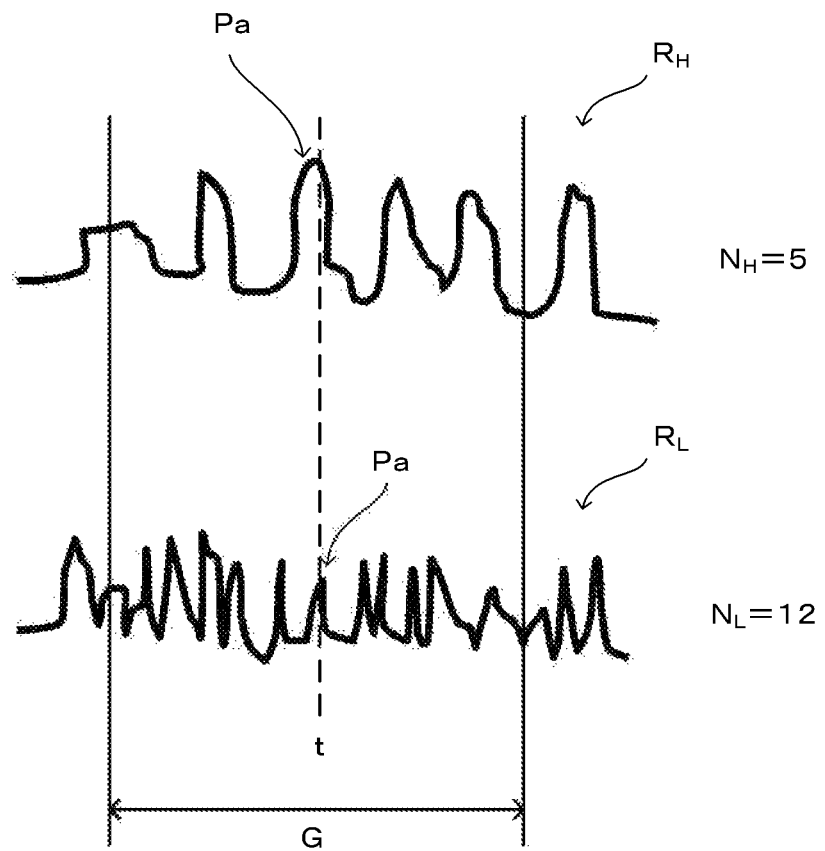
FIG. 5 shows an example of receive signal graph, a low frequency receive signal and a high frequency receive signal being shown in parallel.

FIG. 5 shows an example of receive signal graph, a low frequency receive signal $R_L$ and a high frequency receive signal $R_H$ being shown in parallel.

With reference to FIG. 5, the number of peak counting module 12a can count the number of peak waveforms within a gate range G containing timing t at which peak waveform Pa is determined as being a fish. The gate range G represents a time period whose duration can be set for example depending on the duration of the transmission wave. Typically, the duration of the gate range G is set to 20 times the duration of the transmission wave but it can be adjusted typically up to about 50 times the duration of the transmission wave. The number of peak counting module 12a can count the number of peak waveforms $N_L$ contained in receive signal $R_L$ obtained during the wide beam transmission/reception and the number of peak waveforms $N_H$ contained in receive signal $R_H$ obtained during the narrow beam transmission/reception. In the example of FIG. 5, $N_H$=5 and $N_L$=12. Note that, in, the explanation above, the number of peak waveforms $N_L$ and $N_H$ each corresponds to the density index value. Moreover, the peak waveforms counted by the number of peak counting module 12a not only include peak waveforms determined as being caused by fish by the fish detection module 11 (which detects peak waveforms under strict conditions based on gradient of rising edge etc), but it may include all peak waveforms having a maximum value above a given level.

Figure 6:
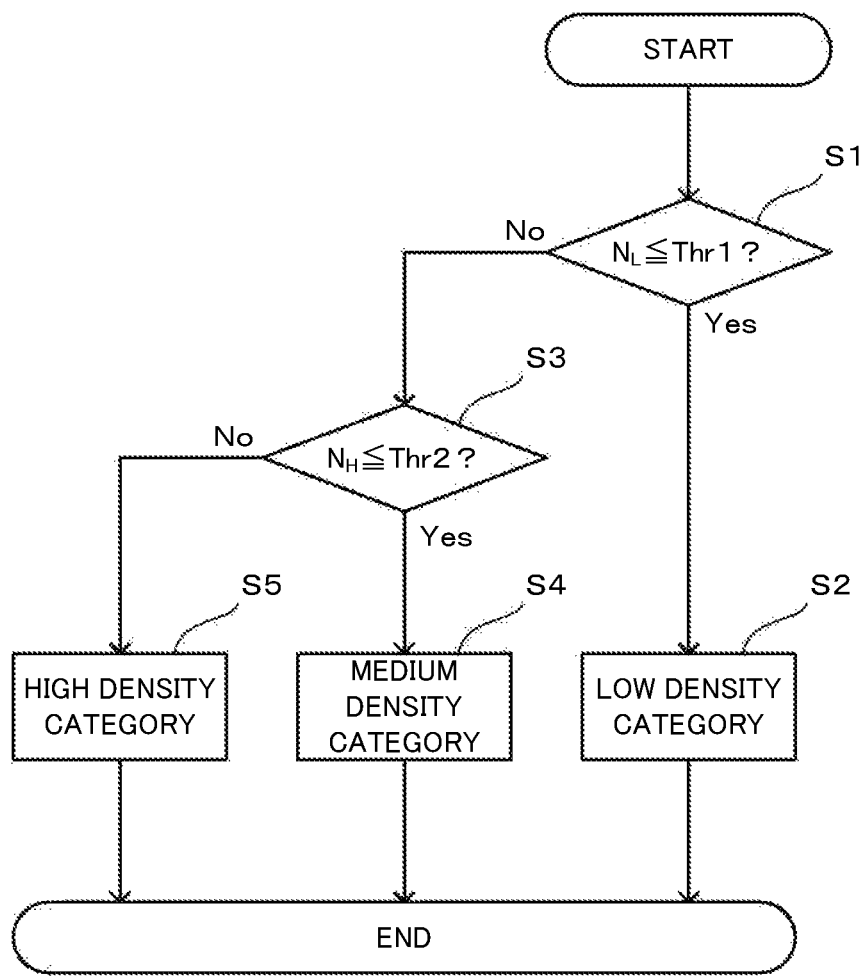
FIG. 6 shows a flow chart of operation of the comparison module shown in FIG. 4.

FIG. 6 shows a flow chart of operation of the comparison module 12b. The comparison module 12b may calculate for each, fish detected by the fish detection module 11 a density category within the given area (e.g., the gate range G) centered on said detected fish based on a comparison of each of the peak numbers $N_L$ and $N_H$ with a first threshold Thr1 and a second threshold Thr2. Specifically, the comparison module 12b compares peak number $N_L$ with first threshold Thr1 (S1), and when $N_L$ is the same as or below Thr1 (S1: YES) the density category is set as LOW (S2).

On the other hand, when $N_L$ is above Thr1 (S1: NO), the comparison module 12b then compares peak number $N_H$ with second threshold Thr2 (S3). When $N_H$ is the same as or below Thr2 (S3: YES) the density category is set as MEDIUM (S4) and when $N_H$ is above Thr2 (S3: NO) the density category is set as HIGH (S5). When the density category is LOW, the density in the vicinity of the fish whose density is to be estimated is estimated as relatively low compared to the MEDIUM and HIGH categories. When the density category is MEDIUM, the density in the vicinity of said fish is estimated as being higher than when the density category is LOW, and when the density category is HIGH, the density in the vicinity of said fish is estimated as being higher than when the density category is MEDIUM. The comparison module 12b can calculate density category for every fish detected by the fish detection module 11. The density category (LOW, MEDIUM, HIGH) calculated by the comparison module 12b for every detected fish is notified to the fish length calculation module 13.

The fish length calculation module 13 can calculate fish length of each fish based on the target strength value (TS value) of fish detected by the fish detection module 11 and the density category (e.g., LOW, MEDIUM, HIGH) estimated by the density index value estimation module 12. More specifically, in some cases, for fish with a LOW density category, the fish length calculation module 13 calculates fish length based on the TS value (which may also be referred to as size index value) of the detected fish. For fish with MEDIUM or HIGH density category, the fish length calculation module 13 calculates fish length similarly as in LOW density but based on an adjusted TS value (namely, a TS value after adjustment, which may also be referred to as size index value) of the detected fish, the TS value being adjusted with an adjustment formula explained hereinafter. The fish length calculation module 13 is set as a size index value calculation module that calculates TS value or adjusted TS value.

When the density category of a fish is MEDIUM, the fish length calculation module 13 may calculate the adjusted TS value by adjusting the TS value with the following formula (1).

$$TS_{AC}=TS_{BC}-10\log_{10}(N_H/N_L)-20\log_{10}(\theta_L/\theta_H)+\alpha \quad (1)$$

When the density category of a fish is HIGH, the fish length calculation module 13 may calculate the adjusted TS value by adjusting the TS value with the following formula (2).

$$TS_{AC}=TS_{BC}-10\log_{10}(N_H/N_L)-20\log_{10}(\theta_L/\theta_H)+\beta \quad (2)$$

In the aforementioned formulas (1) and (2), $TS_{AC}$ is the adjusted TS value, $TS_{BC}$ is the TS value before adjustment, and $\alpha$ and $\beta$ are tuning values with a typically bigger than $\beta$. $\alpha$ and $\beta$ are determined for example depending on an operation environment of the apparatus such as the season, the fishing area, fish species etc.

Figure 7:
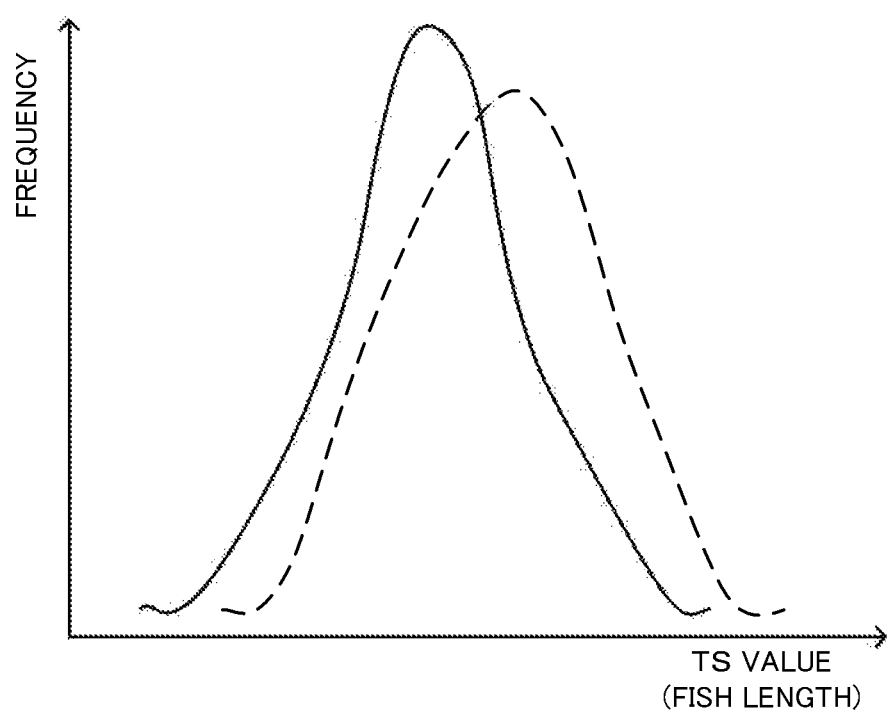
FIG. 7 shows an example of a histogram generated by the histogram generation module shown in FIG. 4 and a histogram generated by a conventional fish finder.

FIG. 7 shows an example of a histogram (solid line) generated by the histogram generation module 14 and a histogram (dotted line) generated by a conventional fish finder. The histogram generation module 14 can generate a fish length, histogram based on, the fish length of each fish calculated by the fish length calculation module 13. The histogram generated by the histogram generation module 14 may be displayed on the operation/display unit 4.

Validity of Histogram Generated by the Histogram Generation Module

In some histograms displaying fish length, frequency distribution, when fish that form a school of fish are densely grouped together, peak waveforms obtained from each fish may mutually interfere with each other and the TS value (representative of fish length) may be estimated to be a value higher than pit actually is. When generating a histogram based on fish length of fish calculated with such problem, the histogram gets shifted on the right (which is the side where fish length is higher) of its actual position. Namely, a conventional fish finder generates a histogram indicating fish school properties that are actually different.

In contrast, using the fish finder 1 of the present disclosure, when fish school density is relatively high (specifically, when the density category is MEDIUM or HIGH), the TS value obtained from the peak value of the receive signal is adjusted to become smaller (i.e., the TS value is reduced) and the histogram is calculated based on fish length of each fish calculated based on the adjusted TS value. As a result, compared with other fish finders that do not use features of the present disclosure, when a fish school is dense, as fish length of each fish becomes smaller than before adjustment of TS value, a histogram close to the actual distribution of the school can be generated.

Note that with the fish finder 1 of the present disclosure, when fish school density is relatively low (specifically, when the density category is LOW), the same histogram as the histogram generated by a conventional fish finder is generated. Namely, when fish school density is relatively low, TS value is not adjusted. This is due to the fact that when, fish school density is relatively low, peak waveforms of receive signals are sparse and tend not to interfere with each other and as a result adjustment of TS value is not necessary.

Consequently, with fish finder 1 of the present disclosure, as fish length of each fish can be appropriately calculated regardless of fish, school density, an appropriate fish school histogram can be generated.

Example Effects

As in the foregoing, in fish finder 1 of the present disclosure, TS value of fish is not only calculated based on peak value of peak waveform caused by fish, but it is also calculated based on the density index value (for example, number of peak waveforms $N_L$ and $N_H$) of fish within a given area. Accordingly, by calculating (adjusting) TS value of fish taking into consideration the density index value that is closely linked to TS value of fish, a more accurate fish length can be calculated and in addition an appropriate fish school histogram can be generated.

Accordingly, fish finder 1 can more accurately estimate size (e.g., length) of target objects (e.g., fish).

Moreover, in fish, finder 1, density index value (e.g., number of peak waveforms $N_L$ and $N_H$) is estimated at each detected fish. Accordingly, based on the density index value estimated at each fish, a more accurate fish length can be estimated for each fish.

Moreover, in fish finder 1, each fish whose fish length is to be calculated is categorized into a plurality of density categories (LOW, MEDIUM, HIGH), and fish length calculation is changed depending on the category. Accordingly, by categorizing density into a plurality of categories, a fish length corresponding to each density category can be appropriately determined.

Moreover, in fish finder 1, for fish whose density category is set as MEDIUM or HIGH, the TS value is adjusted. As fish TS value obtained from relatively dense fish school tends to be different from what it actually is, by performing such adjustment of fish TS value, fish length can be appropriately calculated.

Moreover, in fish finder 1, for fish whose density category is set as MEDIUM or HIGH, the TS value is adjusted so that it becomes smaller after adjustment. As fish TS value obtained from relatively dense fish school tends to be higher than what it actually is, by performing such adjustment of fish TS value, fish length can be appropriately calculated.

Moreover, in fish finder 1, the density index value is calculated based on the number of peaks contained in the receive signal from the fish school. Accordingly, an index indicative of fish school density necessary to obtain a more accurate fish length can be relatively easily and appropriately calculated.

Moreover, in fish finder 1, the fish school histogram classified into fish length is generated based on TS value or adjusted TS value as a size index value calculated for each fish. Accordingly, a histogram close to the actual fish length frequency distribution of the school can be generated.

Moreover, in fish finder 1, the gate range G where density, index value is calculated is set to a range that contains the fish where density is to be estimated. Accordingly, the density index value in the vicinity of the fish where density is to be estimated can be appropriately calculated.

Moreover, fish finder 1 can appropriately calculate fish length information which is essential information for people of the fishing industry such as fishermen.

Modifications

Although several embodiments have been described above, this disclosure is not limited to the above-described embodiments, and various changes may be applied without deviating from the scope of this disclosure.

(1) In the foregoing disclosure, as an example, transmission waves having different frequencies are transmitted in alternation from transducer 2, but this should not be a limitation. Specifically, it is possible to provide two transducers transmitting simultaneously, each transducer transmitting a transmission wave at different frequencies.

(2) In the foregoing disclosure, as a way of forming two beams $BM_L$ and $BM_H$ having different beam widths $\theta_L$ and $\theta_H$, an example forming two beams $BM_L$ and $BM_H$ having different frequencies is explained, but this should not be a limitation. Specifically, it is possible to provide two transducers, each having a transmitting surface of different sizes, and form beams in, alternation with each transducer. In this case, a narrow beam is formed from the transducer having a larger transmitting surface, and a wide beam is formed from the transducer having a smaller transmitting surface.

Figure 8:
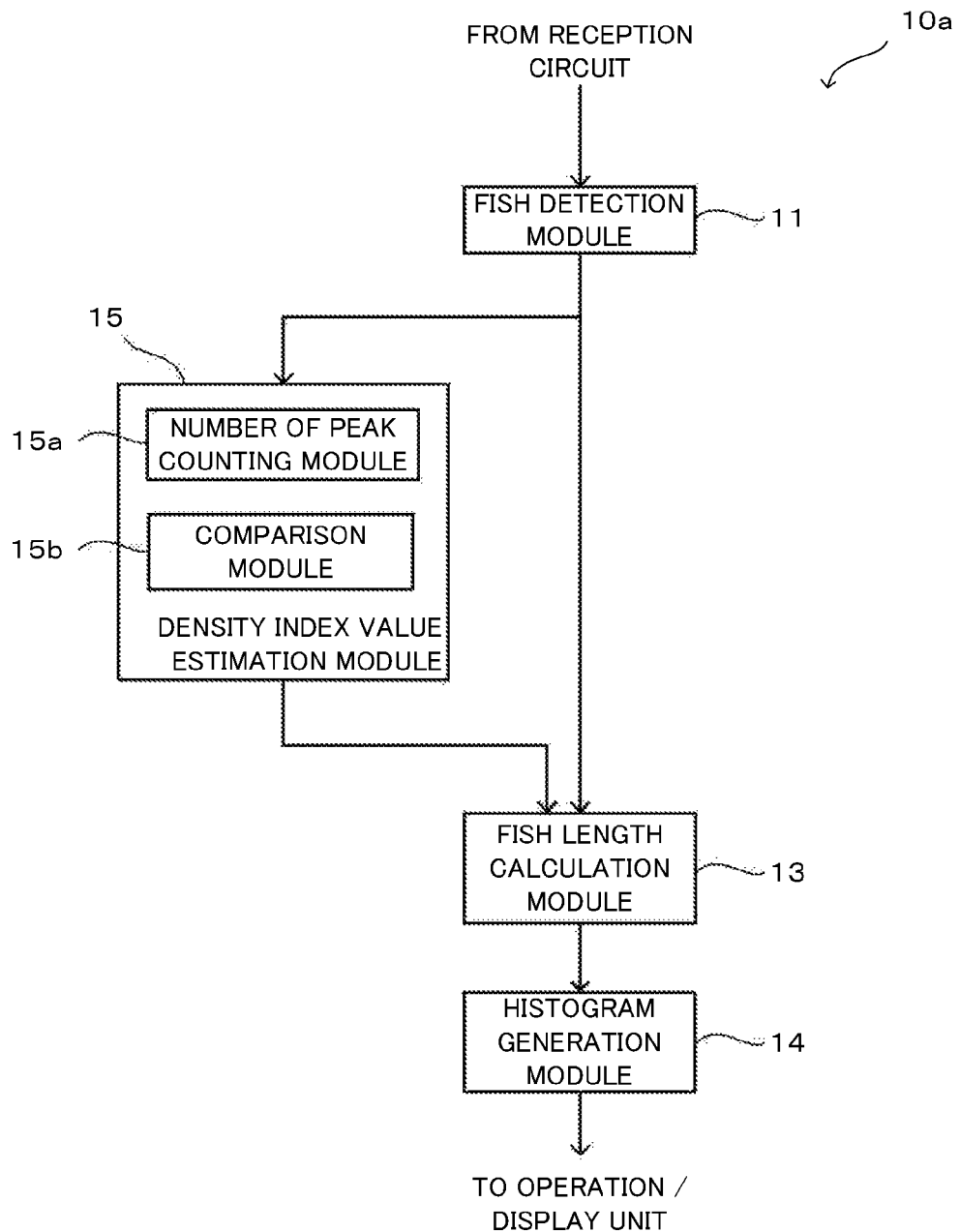
FIG. 8 shows a block diagram of an arrangement of a signal processing module of a fish finder according to a modification.

(3) FIG. 8 shows a block diagram of an arrangement of a signal processing module 10a according to a modification. In the foregoing disclosure, an example forming two beams from transducer 2 (the so-called Dual Beam method) is explained, but this should not be a limitation, a fish finder arranged to use the so-called Single Beam method can be used. Compared to the signal processing module 10 of the foregoing disclosure, the operation of the density index value estimation module 15 of the signal processing module 10a of the present modification differs greatly. Hereinafter, operation of the density Windex value estimation module 15 is mainly explained, other explanations are omitted.

Figure 9:
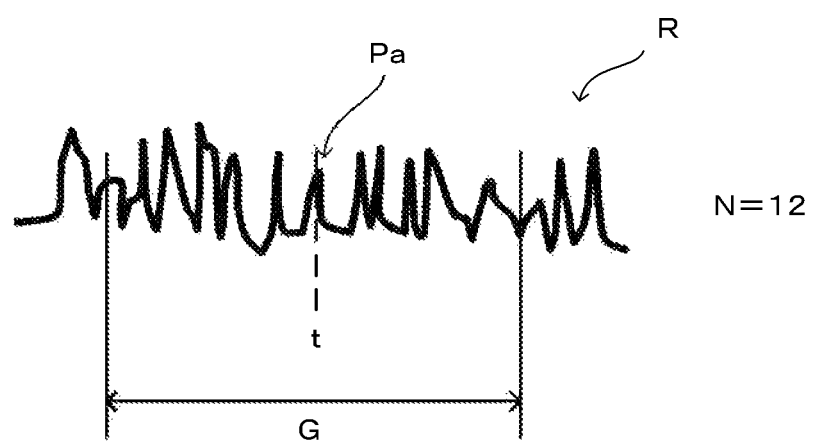
FIG. 9 shows an example of a receive signal graph obtained from a reception wave received by a transducer of the fish finder of the modification.

FIG. 9 shows an example of a receive signal R obtained from a reception wave received by a transducer of the present modification. With reference to FIG. 9, the number of peak counting module 15*a* may count the number of peak waveforms within gate range G containing timing t at which peak waveform Pa is determined as being a fish, as in the foregoing disclosure. The number of peak counting module 15*a* may count the number of peak waveforms N (density index value) contained in receive signal R. In the example of FIG. 9, N=12.

Figure 10:
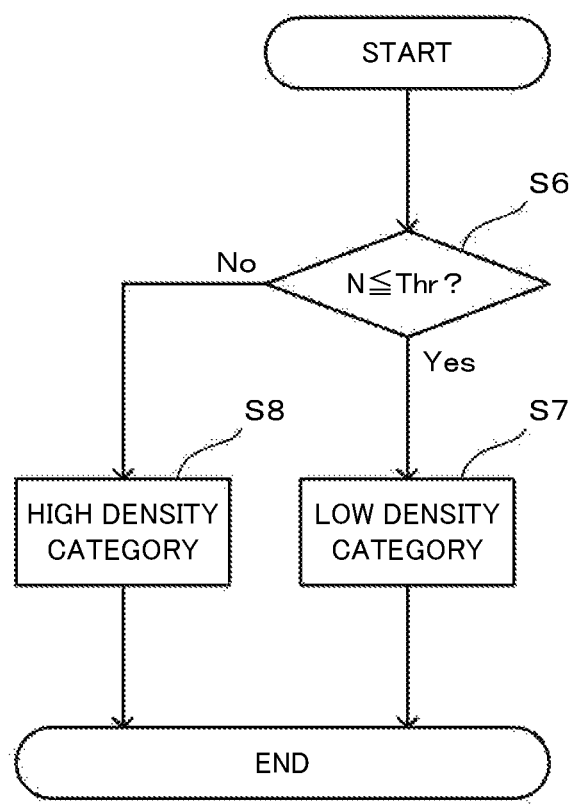
FIG. 10 shows a flow chart of operation of the comparison module shown in FIG. 8.

FIG. 10 shows a flow chart of operation of the comparison module 15*b* shown in FIG. 8. The comparison module 15*b* may calculate for each fish detected by the fish detection module 11 a density category within the given area (gate range G) centered on said detected fish based on a comparison of peak number N with a threshold Thr. Specifically, the comparison module 15*b* compares peak number N with threshold Thr (S6), and when N is the same or below Thr (S6: YES) the density category is set as LOW (S7). On the other hand, when N is above Thr (S6: NO), the comparison module 15*b* sets the density category as HIGH (S8).

As in the foregoing disclosure, in the fish finder of the present modification, when the density category is LOW, fish length is calculated without TS value adjustment. On the other hand, when, density category is HIGH, fish length is calculated based on adjusted TS value. Accordingly, fish length of each fish and histogram can be appropriately calculated, as in the foregoing disclosure.

Note that in the present modification, an example of the fish finder of the present disclosure adapted to the Single Beam method is explained but this should not be a limitation, other methods such as for example the Split Beam method can be adapted to the fish finder.

(4) In the foregoing disclosure, when the density category is MEDIUM and HIGH, fish length of each fish is calculated based on the adjusted TS value, but this should not be a limitation. Specifically, when the density category is MEDIUM and HIGH, it is also possible to exclude the peak waveform from the fish length calculation. Accordingly, as it is possible to exclude from the fish length calculation fish being in condition where it is difficult to obtain an accurate fish length calculation (dense fish school condition), reliability of fish length calculation value can be enhanced. Still, without the above limitation, it is also possible to calculate fish length based on the adjusted TS value when the density category is MEDIUM and to exclude the peak waveform from the fish length calculation when the density category is HIGH.

(5) In the foregoing disclosure, TS value is adjusted with formulas (1) and (2) but this should not be a limitation. Moreover, TS value adjustment can be performed without the use of formulas (1) and (2) or any other formula. As an example, a look-up table establishing a correspondence between density category and adjustment value can be arranged and TS value can be adjusted based on the adjustment value corresponding to the determined density category of each fish.

Figure 11:
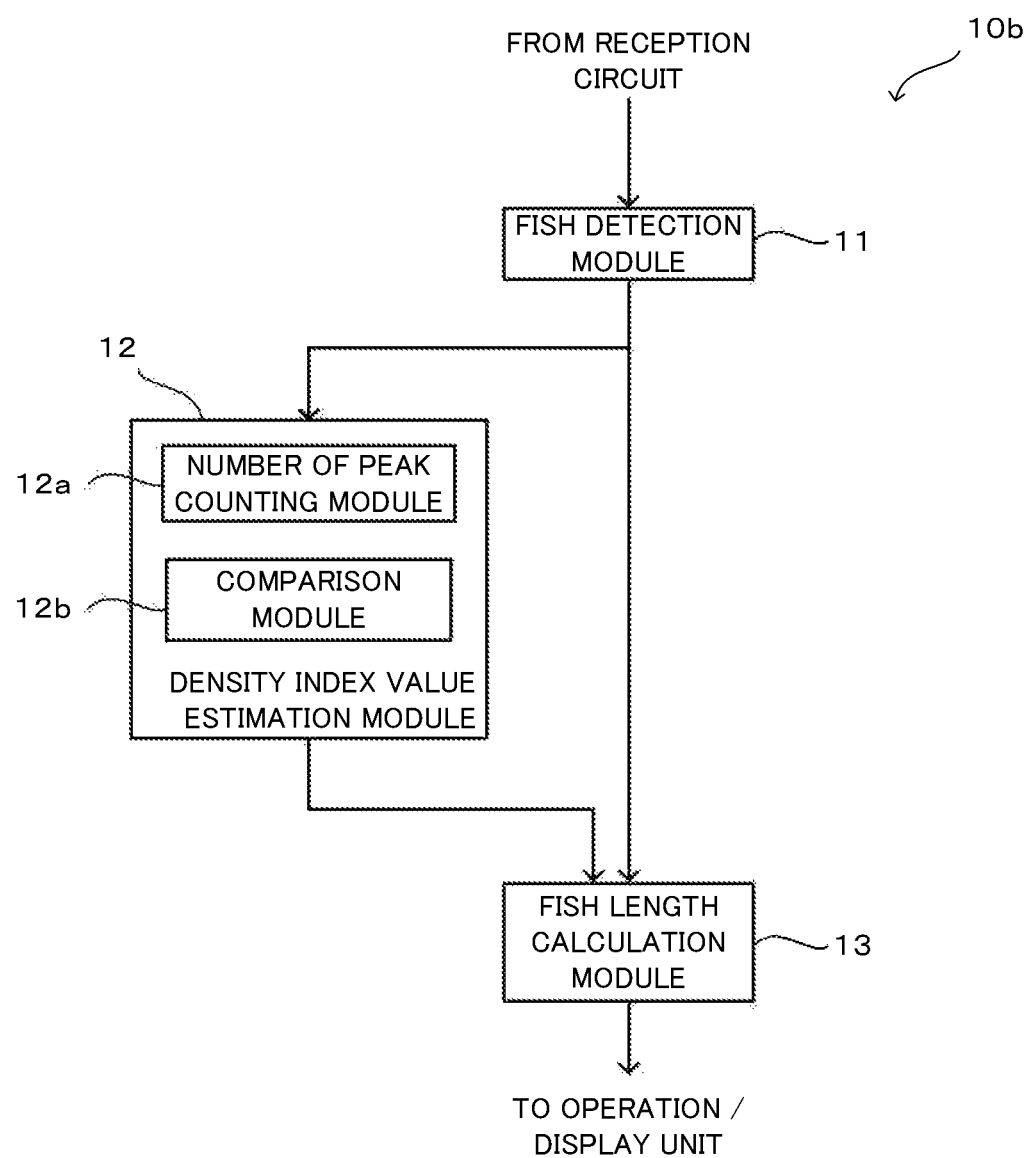
FIG. 11 shows a block diagram of an arrangement of a signal processing module of a fish finder according to a modification.

(6) FIG. 11 shows a block diagram of an arrangement of a signal processing module 10*b* of a fish finder according to a modification. In the foregoing disclosure, histogram generation module 14 generates a histogram, but without limitation to this, an arrangement omitting histogram generation module 14 is possible. In the present modification, as an example, fish length of detected fish can be for example displayed in the vicinity of the fish echo image.

(7) In the foregoing disclosure, a density index value is estimated at each fish, but this should not be a limitation. It is also possible to calculate fish length of each fish based on a density index value of a fish school as a whole. Accordingly, as it is possible to omit calculation of density index value in the vicinity of each fish, the calculation load of the signal processing module can be reduced.

Figure 12:
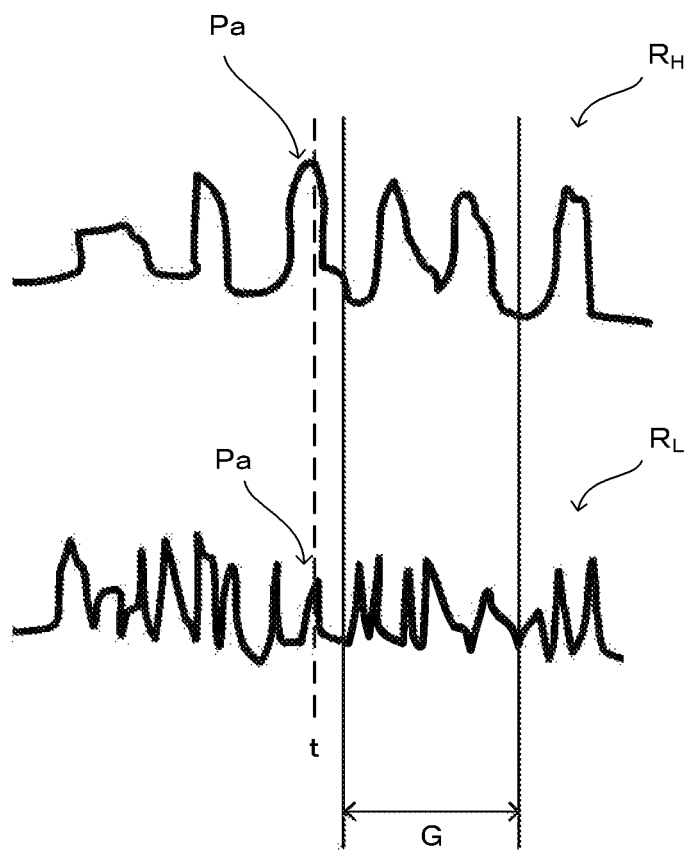
FIG. 12 shows a view to explain a gate range set by a fish finder according to a modification, in comparison with FIG. 5.

(8) FIG. 12 shows a view to explain a gate range G set by a fish finder according to a modification, in comparison with FIG. 5. In the foregoing disclosure, the gate range G as the given area is set to a range that contains the fish where density is to be estimated, but this should not be a limitation. As shown in FIG. 12, it is possible to set gate range G to a range that does not contain said fish.

Figure 13:
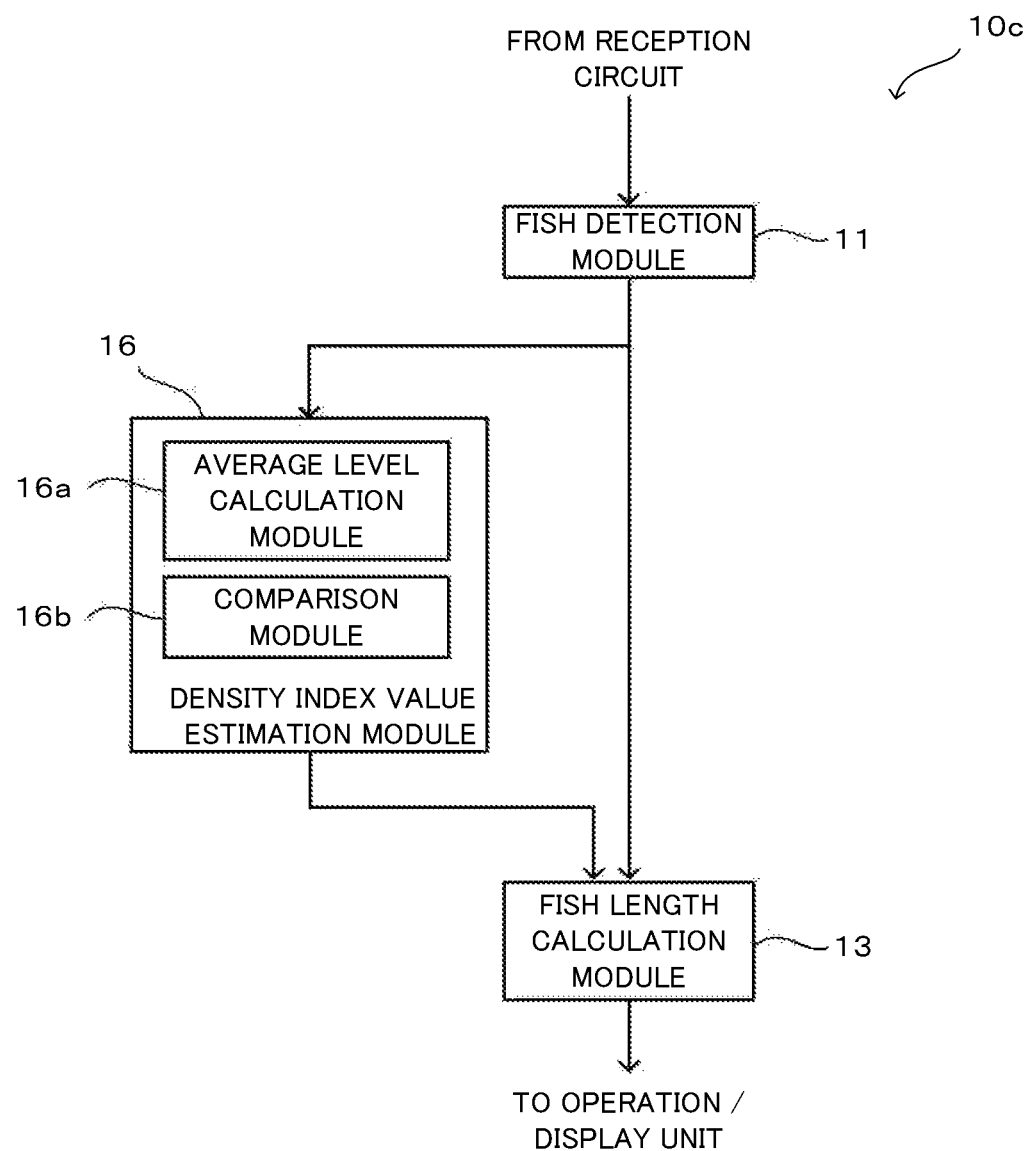
FIG. 13 shows a block diagram of an arrangement of a signal processing module of a fish finder according to a modification.

(9) FIG. 13 shows a block diagram of an arrangement of a signal processing module 10*c* of a fish finder according to a modification. The density index value estimation module 16 of the signal processing module 10*c* of the present modification comprises an average level calculation module 16*a* and a comparison module 16*b*. In the density index value calculation module 16 of the present modification, in a different way from the foregoing disclosure, the density index value is calculated as a difference between the peak value of the detected fish and an average intensity value of the receive signal within the gate range G calculated by the average level calculation module 16*a*. Then, in the present modification, the comparison module 16*b* compares said difference value with a given threshold and calculates the density category of the fish based on the comparison result. Even with such method, as with the foregoing disclosure, an index indicative of fish school density can be relatively easily and appropriately calculated. Note that, as an example, in this case the TS value can be for example adjusted based on a difference level between an average value of the high frequency receive signal within the gate range R and an average value of the low frequency receive signal within the gate range R.

In the foregoing disclosure, TS value is adjusted based on formulas (1) and (2), but this should not be a limitation. As an example, the TS value can be for example adjusted using a difference level between an average value of the high frequency receive signal within the gate range R and an average value of the low frequency receive signal within the gate range R. Or possibly, density index value can be calculated using a difference between the peak value of the detected fish and an average intensity value of the receive signal within the gate range G and TS value can be adjusted using peak number of fish within the gate range G.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than, those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface", The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection apparatus, comprising:
 a transmitter configured to transmit a transmission wave;
 a receiver configured to obtain a receive signal based on
  a reflection of the transmission wave; and a hardware processor programmed to at least:
  detect an underwater target object based at least in part on the receive signal,
  estimate a density index value of objects within a given area in a vicinity of the underwater target object, the density index value indicative of a quantity of the objects within the given area, and
  calculate a size index value of the underwater target object based at least in part on the density index value and a target object signal intensity representing a maximum intensity of the receive signal corresponding to the underwater target object,
  wherein, when the density index value is above a given value, the hardware processor is further programmed to at least reduce the size index value of the underwater target object.

2. The underwater detection apparatus of claim 1, wherein the hardware processor is further programmed to at least:
  categorize the density index value into a category of a plurality of categories, and
  calculate the size index value based on the target object signal intensity and the category.

3. The underwater detection apparatus of claim 2, wherein when the category that represents a range of density index values is above a given value, the hardware processor is further programmed to at least reduce the size index value of the underwater target object.

4. The underwater detection apparatus of claim 1, wherein the given area represents an area that includes the detected underwater target object.

5. The underwater detection apparatus of claim 4, wherein the given area represents a time period that lasts for up to 50 times a duration of the transmission wave.

6. The underwater detection apparatus of claim 1, wherein the hardware processor is further programmed to at least:
  estimate the density index value based at least in part on a number of peaks included in the receive signal within the given area.

7. The underwater detection apparatus of claim 1, wherein the hardware processor is further programmed to at least:
  estimate the density index value based at least in part on an average intensity value of the receive signal within the given area.

8. The underwater detection apparatus of claim 1, wherein the hardware processor is further programmed to at least:
  estimate for each detected underwater target object the density index value of the objects in the vicinity of each detected underwater target object, and
  calculate the size index value of each said underwater target object based on the target object signal intensity corresponding to each said underwater target object and the density index value estimated at each said underwater target object.

9. The underwater detection apparatus of claim 1, wherein the hardware processor is further programmed to at least:
  calculate a size frequency distribution of at least two underwater target objects from a plurality of underwater target objects based on the size index value of the at least two underwater target objects.

10. The underwater detection apparatus of claim 9, wherein the hardware processor is further programmed to at least:
  calculate the size frequency distribution based on the size index value of the underwater target objects whose density index value is below a given value.

11. The underwater detection apparatus of claim 1, wherein the underwater detection apparatus is a fish finder and the underwater target object is a fish.

* * * * *